UNITED STATES PATENT OFFICE.

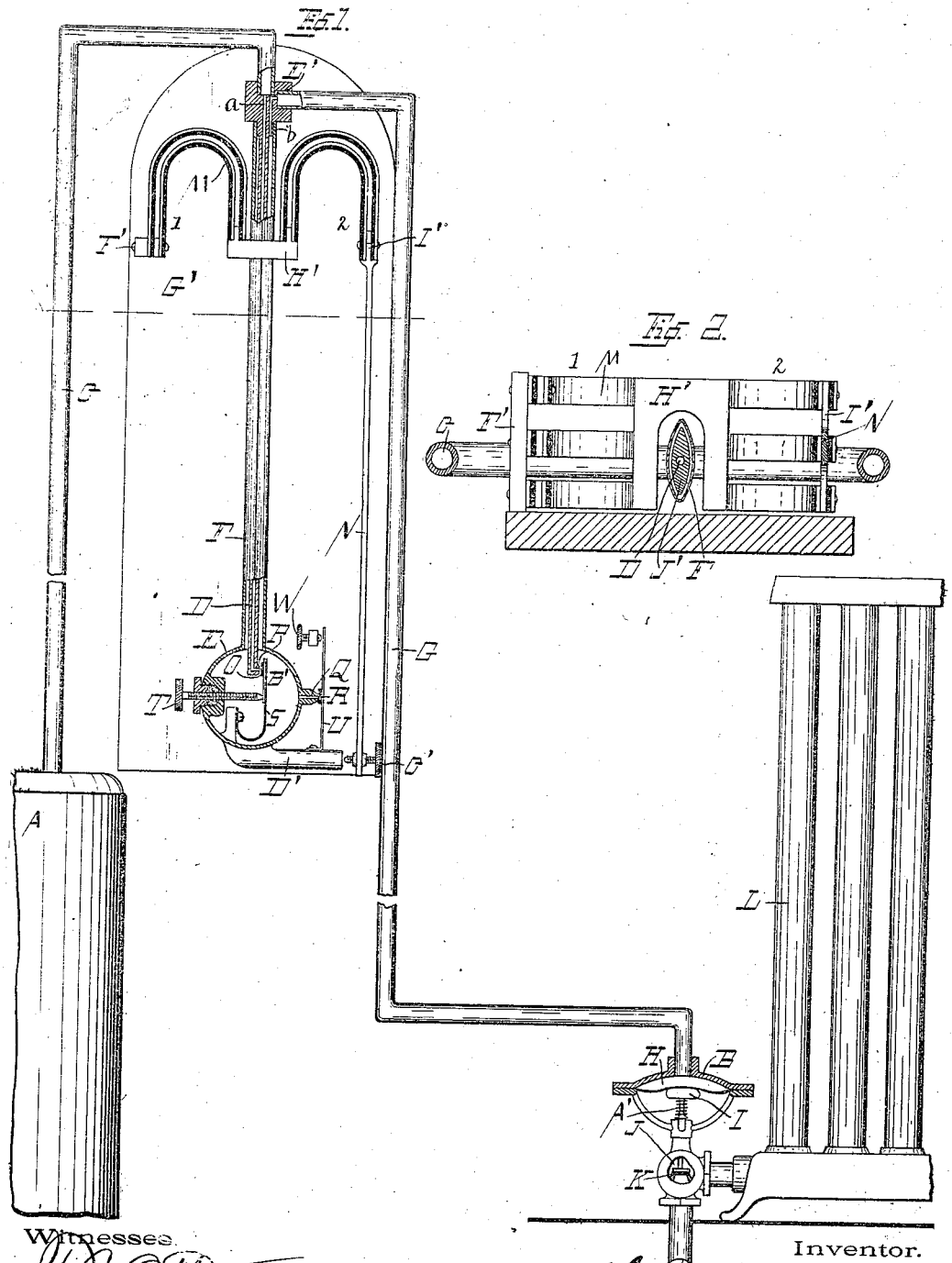

ALFRED ROESCH, OF BRIDGEPORT, CONNECTICUT, ASSIGNOR TO THE DAVIS & ROESCH TEMPERATURE CONTROLLING COMPANY, OF NEW JERSEY.

AUTOMATIC TEMPERATURE-REGULATOR.

SPECIFICATION forming part of Letters Patent No. 616,141, dated December 20, 1898.

Application filed June 7, 1897. Renewed April 23, 1898. Serial No. 678,579. (No model.)

*To all whom it may concern:*

Be it known that I, ALFRED ROESCH, a citizen of the United States, residing at Bridgeport, in the county of Fairfield and State of Connecticut, have invented new and useful Improvements in Automatic Temperature-Regulators, of which the following is a specification.

My invention relates to improvements in that class of automatic temperature-regulators in which compressed air or other fluid under pressure is employed to actuate the steam-controlling valves of radiators or the draft-controlling dampers of furnaces, and a thermostat is employed to actuate such air-controlling valves; and it pertains more especially to the devices by which compressed air or other actuating fluid is automatically controlled in its passage from its containing-reservoir to and from the actuating mechanism of the steam-controlling valves or other draft-controlling appliances.

The object of my invention is to provide a more simple and efficient means for controlling compressed air or other fluid under pressure by the gradual slow movement of a thermostat without permitting such fluid to waste as the position of the air-controlling valves are reversed or changed.

The construction of my device is further explained by reference to the accompanying drawings, in which—

Figure 1 represents a front view, part in section, of the same shown in connection with an air-reservoir and the steam-controlling valve mechanism of a heat-radiator. Fig. 2 represents a horizontal section drawn on line X X of Fig. 1 as it appears from below.

While a piston and cylinder may, if desired, be substituted for the diaphragm-chamber shown for controlling the steam valve or damper and other fluid may be substituted for compressed air for actuating the same, I have for brevity limited the description of the device to its use with compressed air in connection with a diaphragm for actuating a steam-controlling valve.

Like parts are referred to by the same reference letters and numerals in both views.

A represents an air-reservoir from which compressed air is conducted to the diaphragm-chamber B of the steam-controlling valve through the tube C, central stationary duct D, vibratory air-chamber E, flexible exterior tube F, and stationary tube G, when it acts against the diaphragm H, whereby said diaphragm is forced downward, and motion is communicated from it through the bearing-disk I and valve-stem J to the steam-controlling valve K, whereby said valve is closed and the further admission of steam to the radiator L is cut off. When by a reverse movement of the air-controlling valve the compressed air is permitted to escape from the diaphragm-chamber B, said diaphragm and the steam-controlling valve K are raised by the action of the spiral spring A', when the steam is again admitted to the radiator.

It will be understood that the tube F, from which the air-chamber E is suspended, is slightly flattened, as shown in Fig. 2, and is made of thin flexible material which will permit said chamber E to be easily moved a slight distance toward the right and left by the action of the thermostat M as the latter is caused to move by the varying changes of temperature, and the several air-controlling valves are so arranged as to be opened and closed by the vibratory movement of said chamber E. When by a rise of temperature the actuating-arm N of the thermostat is thrown toward the right, the air-chamber E is permitted to swing by its own gravity or other equivalent means toward the right in the position shown in Fig. 1, whereby the valve O, which is supported from the chamber E, is carried away from its seat or port P, when the air from the reservoir A is admitted to the chamber E through the central stationary duct D and valve-seat P, when it passes out through the exterior flexible tube F and thence through the tube G to the diaphragm-chamber B, as previously mentioned. When by a change of temperature the arm N is thrown toward the left, it carries with it the chamber E, whereby the valve O is brought against its seat and the further admission of air to the chamber E is thereby cut off. It will be obvious that as the valve O is thus closed by the leftward movement of the chamber E the escape-port Q of said air-chamber is carried away from its valve R, thereby relieving said chamber E and the diaphragm-chamber B, communicating therewith, from pressure, whereby the steam-controlling valve is opened by the recoil of the spring A' in the ordinary manner.

The valve O is supported upon a spring-plate S and adjusted from the exterior by the hand-screw T. The valve R is supported upon a spring-plate U and adjusted by the hand-screw W. The respective valve-supporting spring-plates S and U are so adjusted relatively to each other as to cause the escape-valve R to always close before the inlet air-valve O is opened, and, vice versa, to always close the inlet-valve O before the escape-valve R is opened. For example, when the chamber E moves from the position shown in Fig. 1 toward the left the escape-valve R will be caused by the tension of its supporting-spring U to move, with its seat Q, until the valve O is brought to its seat P and said seat P closed, when the valve R will then be stopped by contact of its supporting spring-plate U with the adjustable hand-screw W, whereby as the chamber E moves farther toward the left the seat Q will be carried away from its valve R, thereby opening said valve and permitting the air to escape, whereby it is obvious that the air cannot escape past the valve R until the valve O is closed. When the chamber E moves toward the right, the valve R, with its supporting-spring, will first be moved away from its stop and said valve permitted to close before the valve O is carried away from its seat, whereby the escape-valve R is closed, as stated, before the inlet-valve O is opened, and whereby waste of air is avoided.

The actuating-arm N of the thermostat is provided with an adjusting hand-screw C', which is adapted to bear against the arm D' of the swinging air-chamber E, whereby the motion of the thermostat is communicated to said chamber. The hand-screw C' is turned inward toward the swinging chamber E to accelerate the movement of the air-controlling valve when by a reverse movement of said hand-screw C' the action of the thermostat over said air-controlling valves is retarded. Thus the hand-screw C' may be adjusted to maintain such variation of temperature as may be desired.

The air-duct C communicates with the stationary air-duct or tube D through the intermediate air-duct a, formed in the connecting-block E', which block E' is rigidly secured to the bed-plate G', while the air-tube G communicates with the exterior tube F through the air-duct b, formed in said connecting-block E'.

The thermostat M may be of the ordinary construction; but with a view of multiplying its strength and action I have shown two series 1 and 2 of three each, the first series 1 of which is supported from the stationary bar F', which bar in turn is secured to the bed-plate G', while the second series 2 is secured to the movable ends of the first series by the connecting-block H', while the free ends of the second series are connected together by the cross-bar I', to which the valve-connecting arm N is secured.

The central stationary duct D is formed in the bar J', which is preferably made elliptical in cross-section, as shown in Fig. 2, while the exterior flexible tube F is slightly flattened and made to conform to the shape of the bar J', which it surrounds, whereby said exterior tube F is made more flexible and is thereby more easily actuated by the arm of the thermostat.

Having thus described my invention, what I claim as new, and desire to secure by Letters Patent, is—

1. In a temperature-regulator, the combination of a vibratory air-chamber; a stationary or rigid air-duct communicating between the vibratory air-chamber and the air-reservoir; a flexible duct communicating from the interior of said vibratory air-chamber with a piston or diaphragm chamber; an inlet air-valve located within said vibratory air-chamber and adapted to be actuated by the vibratory movement of said chamber and to control the admission of air thereto; an escape air-duct communicating from the interior of said chamber; an exterior valve adapted also to be actuated by the vibratory movement of said air-chamber and to control the escape of air therefrom; and a thermostat adapted, as it is moved by varying changes of temperature, to actuate said vibratory air-chamber, substantially as and for the purpose specified.

2. In a temperature-regulator, the combination of a vibratory air-chamber; a stationary or rigid air-duct communicating between said vibratory air-chamber and an air-reservoir; a flexible duct communicating from the interior of said vibratory air-chamber, with a piston or diaphragm chamber; an inlet air-controlling valve; a yielding or flexible support therefor, located within said vibratory air-chamber and adapted to be actuated by the vibratory movement of said chamber, and to control the admission of the air thereto; an escape air-duct communicating from the interior of said air-chamber; an exterior air-valve; a yielding or flexible support therefor, located upon the exterior of said vibratory air-chamber and adapted to be actuated by the vibratory movement of said chamber, and to control the escape of air therefrom; and a thermostat adapted, as it is moved by the varying changes of temperature, to actuate said vibratory air-chamber, substantially as and for the purpose specified.

3. In a temperature-regulator, the combination of a vibratory air-chamber; a stationary or rigid air-duct communicating between said vibratory air-chamber and an air-reservoir; a flexible duct communicating from the interior of said vibratory air-chamber, with a piston or diaphragm chamber; an inlet air-controlling valve; a yielding or flexible support therefor, located within said vibratory air-chamber and adapted to be actuated by the vibratory movement of said air-chamber, and to control the admission of air thereto; an adjustable hand-screw communicating through the walls of said vibratory air-chamber with, and adapted to adjust, the flexible or yielding support of said inlet air-controlling valve; an escape air-duct communicating from the interior of said air-chamber; an exterior air-valve; a yielding or flexible support therefor, located upon the exterior of said vibratory air-chamber and adapted to be actuated by the vibratory movement of said chamber, and to control the escape of air therefrom; an adjustable hand-screw having a stationary bearing-support, located upon the exterior of said air-chamber and adapted to adjust the yielding or flexible support of said air-controlling escape-valve; and a thermostat adapted, as it is moved by the varying changes of temperature, to actuate said vibratory air-chamber, substantially as and for the purpose specified.

4. In a temperature-regulator, the combination of a vibratory air-chamber; a stationary or rigid air-duct communicating between said vibratory air-chamber and an air-reservoir; a flexible duct inclosing said stationary or rigid duct, communicating from the interior of said vibratory air-chamber with a piston or diaphragm chamber; an inlet air-controlling valve; a yielding or flexible support therefor, located within said vibratory air-chamber and adapted to be actuated by the vibratory movement of said chamber, and to control the admission of air thereto; an adjustable hand-screw communicating through the walls of said vibratory air-chamber with, and adapted to adjust, the flexible or yielding support of said inlet air-controlling valve; an escape air-duct communicating from the interior of said air-chamber; an exterior air-valve; a yielding or flexible support therefor, located upon the exterior of said vibratory air-chamber and adapted to be actuated by the vibratory movement of said chamber, and to control the escape of air therefrom; an adjustable hand-screw having a stationary bearing-support located upon the exterior of said air-chamber and adapted to adjust the yielding or flexible support of said air-controlling escape-valve; a thermostat adapted, as it is moved by the varying changes of temperature, to actuate said vibratory air-chamber; and an adjustable hand-screw supported from the actuating-arm of said thermostat and adapted to be adjusted in its relation to the bearing-surface of said vibratory chamber, said yielding or flexible supports being respectively adjusted by said bearing-screws as to cause the escape-valve of said air-chamber to close before the inlet-valve is opened, as said chamber is moved in one direction, and the inlet-valve to close before the escape-valve is opened, as said chamber is moved in the opposite direction, all substantially as and for the purpose specified.

In testimony whereof I affix my signature in the presence of two witnesses.

ALFRED ROESCH.

Witnesses:
    FRED. H. DAVIS,
    HAROLD FISH.